United States Patent
Holz et al.

(10) Patent No.: US 6,877,879 B2
(45) Date of Patent: *Apr. 12, 2005

(54) PROCESS FOR IMPROVING THE VISIBILITY IN VEHICLES

(75) Inventors: Michael Holz, Senden (DE); Edgar Weidel, Senden (DE)

(73) Assignee: DaimlerChrysler AG (DE)

( * ) Notice: Subject to any disclaimer, the term of this patent is extended or adjusted under 35 U.S.C. 154(b) by 29 days.

This patent is subject to a terminal disclaimer.

(21) Appl. No.: 10/158,544

(22) Filed: May 30, 2002

(65) Prior Publication Data

US 2002/0181240 A1 Dec. 5, 2002

(30) Foreign Application Priority Data

May 31, 2001 (DE) .......................................... 101 26 492

(51) Int. Cl.[7] .................................................. B60Q 1/00
(52) U.S. Cl. ...................... 362/259; 362/545; 362/464; 387/209.99
(58) Field of Search ................................. 362/257, 259, 362/545, 230, 231, 464, 465, 555; 356/4.01; 348/148, 162, 164, 207.99

(56) References Cited

U.S. PATENT DOCUMENTS

| | | | | |
|---|---|---|---|---|
| 4,447,800 A | * | 5/1984 | Kasuya et al. | 340/904 |
| 5,835,203 A | * | 11/1998 | Ogura et al. | 356/5.01 |
| 6,067,110 A | * | 5/2000 | Nonaka et al. | 348/148 |
| 6,406,172 B1 | * | 6/2002 | Harbers et al. | 362/544 |
| 6,601,980 B2 | * | 8/2003 | Kobayashi et al. | 362/510 |
| 6,601,982 B1 | * | 8/2003 | Begemann et al. | 362/545 |
| 2003/0001955 A1 | | 1/2003 | Holz | |
| 2003/0025799 A1 | | 2/2003 | Holz | |

FOREIGN PATENT DOCUMENTS

| | | | |
|---|---|---|---|
| DE | 4007646 A1 | * | 9/1991 |
| DE | 40007646 A1 | * | 9/1991 |

* cited by examiner

Primary Examiner—Thomas M. Sember
Assistant Examiner—Hargobind S. Sawhney
(74) Attorney, Agent, or Firm—Pendorf & Cutliff

(57) ABSTRACT

The invention concerns a process for improving the view in vehicles, in particular at night, poor weather and fog, in which laser light is emitted at a wavelength outside the visible spectrum in a predetermined angular range, which is being observed with a camera, of which the images are provided to the vehicle operator. The laser light is emitted essentially continuously only when the headlights of the vehicle are in operation and/or when the vehicle is in motion. In this manner the vision of other traffic participants is ensured in a particularly simple manner.

6 Claims, 1 Drawing Sheet

PROCESS FOR IMPROVING THE VISIBILITY IN VEHICLES

BACKGROUND OF THE INVENTION

1. Field of the Invention

The invention concerns a process for improving the visibility in vehicles, in particular at night, poor weather and fog, wherein laser light in a wavelength outside the visible spectrum is emitted to a predetermined angle area, recorded via a camera, of which the images are then supplied to the vehicle operator.

2. Description of the Related Art

Poor visibility at night is a stressful and dangerous situation, and is feared by many drivers. The occurrence of accidents is significantly higher under poor visibility conditions than in the case of vehicle operation by day under good visibility conditions. In particular at night, the following difficulties occur:

The range of view is reduced in the case of low beams from on-coming traffic, and the range of view is underestimated by many vehicle operators. The leads to a late recognition of non-illuminated obstacles, pedestrians, bicycles without light and of animals, and therewith leads to accidents.

The vehicles operator is blinded for a short time by the headlights of oncoming vehicles and their reflection particularly in the case of wet road surfaces, so that in effect the vehicle operator is driving for a short period of time into a black hole. Particularly endangered are those with poor night vision and older vehicle operators due to their reduced vision capacity.

In the case of rain, fog and snowdrifts the range of vision can again be substantially reduced.

An improvement of the view at night can be achieved by an opto-electronic system, as disclosed for example in DE 40 07 646 A1. The system records a video image of a traffic scene and presents this to the vehicle operator in suitable form. The presented image contains supplemental information, which the vehicle operator cannot see with his own eyes or can only recognize with difficulty, in particular at night, poor weather and fog.

In addition to the normal headlights this system supplementally contains infrared headlights, which utilize near infrared emitting laser diodes as light sources. The laser diodes are driven pulsed. A CCD-camera is incorporated in the roof of area of the vehicle for recording a video image. The CCD-camera has an electronic gate, which is synchronized with the laser diodes. An optical band pass filter is introduced in front of the camera lens. The video image is shown to the vehicle operator on a LCD-display.

The lasers emit in the near infrared at a wavelength of 810 nm. Since the infrared light is nearly invisible to the human eye and since the output of the utilized light is not higher than that of a conventional vehicle headlight, one has until now presumed that illumination can occur continuously, without endangering other vehicle operators.

Nevertheless it is desirable for purposes of improved safety to preclude any possibility of any conceivable danger to other vehicle operators.

SUMMARY OF THE INVENTION

The invention is thus concerned with the task, of protecting the vision of vehicle operators in a particularly simple and reliable manner.

The task is accomplished by a process comprising:
emitting laser light in a wavelength outside the visible spectrum to a predetermined angle area,
observing said angle area by means of a camera sensitive to said wavelength,
supplying images from said camera to the vehicle operator,
wherein said laser light is essentially continuously emitted only when one of (a) the headlights of the vehicle are in operation and (b) the vehicle is in motion.

The information as to whether the normal headlights of the vehicle are in operation or, in certain cases, whether the vehicle is in motion is automatically available in modern vehicles which utilize onboard computers. Otherwise, it could be obtained with very simple electrical or electronic means.

On the basis of this information one or more laser headlights are continuously operated in accordance with the invention, either when the headlight of the vehicle is also in operation, in particular when the long range or high beam is switched on, or in the case that the vehicle is in motion, when both the headlight is in operation as well as the vehicle is in motion.

The operation of the headlight is a reliable indicator therefore, that the night safety device is actually needed. If the headlights are turned off, then also the night vision system is turned off, so that the laser headlights no longer represent any kind of danger.

If one makes the activation or the case may be deactivation of the laser headlights additionally or alternatively dependent on whether the vehicle is in motion, in particular in the forward direction, then there is supplementally avoided the situation, that any stationary person, for example a immobile pedestrian or bicyclist, which has a view towards the front side of the vehicle, is impinged by a continuous laser light source, a situation which, due to the coherency of the laser light, could represent a real danger following substantial periods of exposure. On the other hand, during forward motion of the vehicle the laser light can fall for a few milliseconds upon the same position in the epidermis of a vehicle operator, who is located a safe distance from the vehicle, so that the safety to the eyes is insured under all conceivable circumstances.

Further substantial advantages of the invention lie therein, that the operational times are optimized for periods of use and a savings in energy and, besides this, a saving of the laser light sources, which have a limited life, as a result.

In a preferred embodiment the laser light is emitted by two or more different kinds of laser headlights, which respectively illuminate different part of the area to be monitored. This has the advantage, that the type of the light source, the light output, the lens and in certain cases the wavelength of the respective laser headlights can be optimally adapted to the respective illumination purposes, for example for a "street headlight" 3 and a "person headlight" 2. By the appropriate selection of the parts to be illuminated by different types of laser headlights and their areas of overlap one can in very simple manner optimize the total illumination characteristic.

In a further preferred embodiment the laser light is produced at a position removed from the front side of the vehicle and conveyed to the front side of the vehicle by a light guide, where it is emitted using a suitable lens. This has the advantage, that the sensitive laser light source can be housed in any desirable protected position, for example within the electronics of the night vision system. It is thus necessary to provide at the front of the vehicle only the robust light emission optics.

The use of light guides besides this has the advantage, that they can be branched in simple manner, either to supply multiple light emission optics with laser light from a common source or to supply light from multiple laser light sources, which could have different wavelengths, to a common light emission optic.

In a further preferred embodiment information for communication between vehicles is modulated onto the laser light, which can be received by means of a supplemental detector or the camera. The advantage of this embodiment of the invention lies however in the common utilization of essential parts of the night vision system both for improving vision as well as for communication.

When the camera is mounted in the area of the roof of the vehicle behind the front windshield, normally an area of the windshield wiped by the windshield wipers of the vehicle are in the field of view of the camera. In this case, in a preferred embodiment of the invention the camera and the windshield wipers are driven synchronized with each other, that means, either the operation of the camera is synchronized with the windshield wipers, such that it is operated only in the case of unimpeded view or, as the case may be, only in this case is the video image further communicated to the display device and reproduced thereupon, or the camera is only operated in predetermined intervals and the windshield wiper is so operated, that it crosses over the field of view of the camera during the operational pauses.

When the headlights or as the case may be camera or display device are operated in intervals, be this in the case of non-moving vehicle or during those phases, in which the windshield wipers cross over the field of view of the camera, the respective preceding display image can be "frozen", such that the operator is not irradiated by an interrupted display.

BRIEF DESCRIPTION OF THE DRAWINGS

Further characteristics and advantages of the invention can be seen from the following description of one illustrative embodiment of the system for improving the view in vehicles.

DETAILED DESCRIPTION OF THE INVENTION

Figure 1:
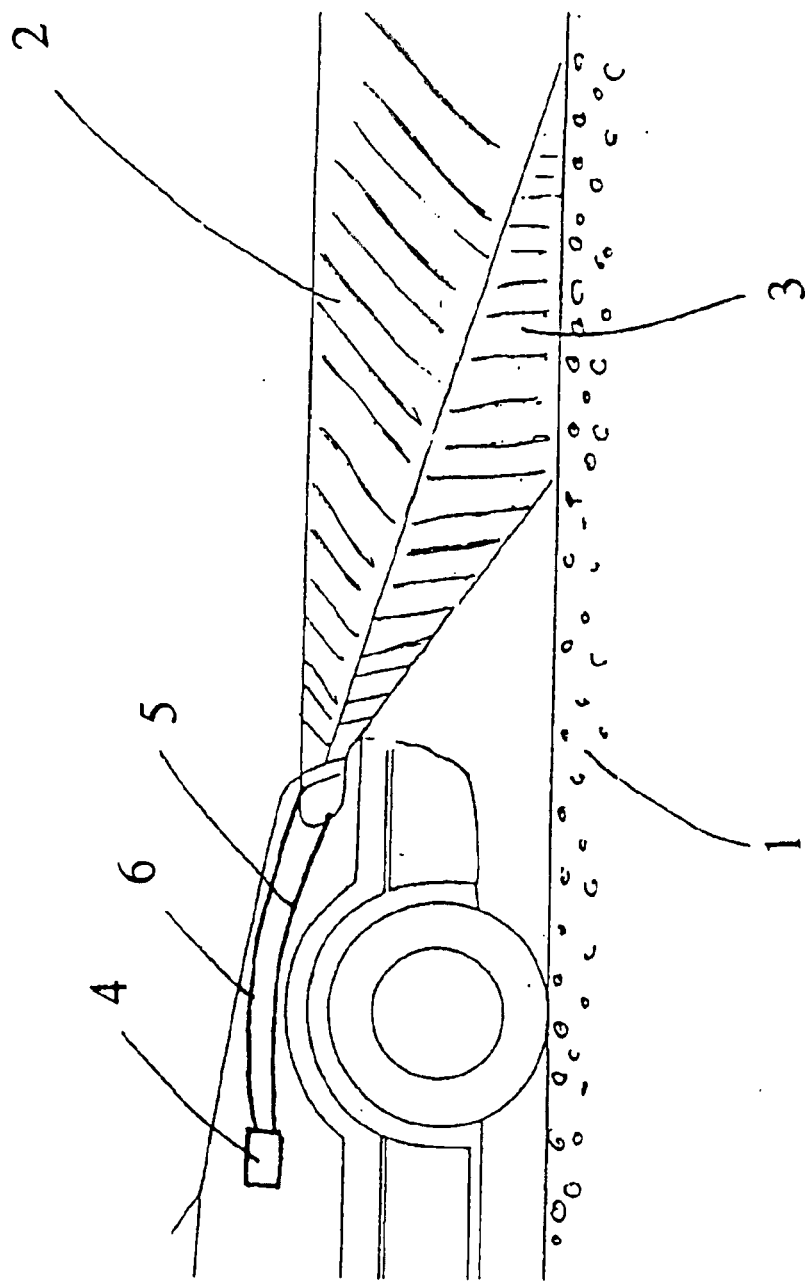

An automobile has two or more infrared headlights emitting in the direction of the operation of the vehicle. Each laser headlight contains one or more infrared lasers, in particular laser diodes, which operate in the near infrared range. Alternatively the system can operate in other spectral regions outside of the visible spectrum, for example in the far infrared or with ultraviolet light.

If each laser headlight contains only one laser, there are different possibilities, for illuminating or painting over the angle area ahead of the vehicle to be observed:
a) simultaneous illumination of the entire region by two dimensional beam broadening of the laser beam
b) beam broadening only in one direction, with simultaneous more narrow bundling in the orthogonal second direction and pivoting (scanning) of an illuminated flat angle area in the second direction
c) pivoting the entire laser beam in two dimensions for the sampling illumination of the entire observed angle area.

Alternatively there is the possibility of employing an array of laser diodes, which collectively illuminate the entire observed angle area, as laser headlights.

In the illustrative embodiment two different types of laser headlights are employed, which respectively illuminate different parts of the observed angle area to be observed. A first type of headlight, either a single or individual headlight or also multiple, for example two laser headlights 3 which respectively area provided in the vicinity of the conventional headlights, illuminate similar to the conventional headlights, the street 1 lying essentially ahead of the vehicle, that is, a relatively narrow segment of the observed area to be observed. A second type of laser headlight, likewise either a individual headlight or multiple, for example two laser headlights 2 which are provided respectively in the vicinity of the conventional headlights, irradiates or illuminates the just observed angle with center of gravity in the area just ahead of the vehicle, that is from the vehicle diagonally downward, as well as—as the case may be asymmetrically—diagonally to the side. Insofar the second type of laser headlight has an irradiation characteristic, which is similar to the conventional low beams, but however since they are not blinding, can be oriented further upwards, in order to reliably detect persons situated at the edges of the street.

The use of two different types of laser headlights has the advantage, that the laser and the lenses or optics of the individual laser headlights can be optimized for the respective intended use. For a "street headlight" 3 one could use for example with a single laser diode without any type of lens for broadening the beam, when the emission characteristic of the laser diode conforms to that of the "low beam". On the other hand the coherency of the laser for the "person headlight" 2 and the lens for beam widening is not subjected to any stringent requirement. Further, the light output and possibility also the wavelength of the two type of laser headlights can be adapted optimally for the respective employment purpose.

The laser light can, but is not absolutely required to be, mounted directly on the front of the vehicle as in the case of conventional headlights. In one embodiment one or more laser light sources 4 are housed in the vehicle electronic system or in another protected location, from which the laser light is conducted to one or more light emitting lenses via light guides 5,6, which form the laser headlight or headlights. The light guides can also branch, so that for example one laser can supply multiple laser headlights. Or one could direct the light from multiple lasers, such as for the above described optimization of the illumination they have different wavelengths, to the headlights via uniting or optically with each other coupled light guides to one or more laser headlights.

The vehicle further includes a camera as image sensor, which is so constructed, that it records the traffic scene, which is presented in the direction of travel. The camera is sensitive at least for the light emitted in the area of the one or more headlights, in this example the near infrared. The video image recorded by the camera is displayed to the operator of the vehicle via a display device in the vehicle, which could be for example a display on the dashboard or a projector for feeding the image such that it is mirrored in an area of the windshield in the manner of a heads up display.

The camera is incorporated immediately behind the windshield in the vicinity of the rearview mirror, such as described for example in GB 2271139 A1. As described therein, the windshield contains at this point an insert of an IR-transmissive material. In the presently described embodiment a windshield of a homogenous material is employed, which is covered with an infrared reflective foil for minimizing the heat absorption in the cabin. This foil is omitted in the area of the field of view of the camera, in order to be transmissive to infrared light for the camera, wherein the small amount of IR-absorption in the glass itself can be disregarded.

The vertical separation between the one or more conventional headlights and the laser headlights on the one hand and the camera on the other hand should be as large as possible, so that the camera can see through the haze, the atmospheric scatter. In this connection the placement at the height of the rearview mirror, where one also provides today for example a rain sensor, is advantageous, can however possibly be further improved depending on vehicle design, in that the camera is positioned always as high as possible.

In the above described arrangement of the camera behind the front windshield one further takes into consideration that the area of the windshield lying in the field of view of the camera lies usually in the working area of a windshield wiper, so that the camera also has clear view even in rain. In the illustrative embodiment the camera and the windshield wiper are operated synchronized to each other, for example in that respectively at that instant in which the windshield wiper is in the field of view of the camera, it is not the actual image, but rather the last recorded image which is reproduced on the display device in the vehicle. The omitted or bridged interval is so short, that it is not noticed by the vehicle operator.

If positioning of the camera so high in the vehicle is not possible or not desired for some reason, the camera can be unobtrusively, and without interference by the windshield, housed in the outside mirrors. If a second camera is introduced in the second outside mirror, then a stereo vision is possible and therewith a distance measurement of objects becomes possible, without the requirement for a separate distance sensor.

In another embodiment the camera is not sensitive only in the wavelength region of the one or more laser headlights, but rather also in the visible spectrum, which is the case for example with a CCD-sensor, if one omits the otherwise conventional filter for visible light or provides the possibility for deactivating this. Thereby it becomes possible to use the camera in addition to the case of poor visibility also as a daylight camera, for example for recording images of the actual traffic scene, on the basis of which an automatic recognition of road edges, traffic signs or other safety relevant details can be carried out. The recognized details are evaluated in the respect to whether a danger situation is present, for example by departing from the roadway or exceeding the acceptable speed, whereupon the vehicle operator is then provided with an acoustic or optical warning signal.

If the sensitivity of the camera as required for IR-night vision is too high for use as a daylight camera, then it is provided with an automatically adjustable iris, which during daylight is closed to the extent that the camera is not overexposed. There are however also cameras, of which the light sensitivity can be adjusted by means of their electronics to the respectively required value, so that a mechanical solution can be dispensed with.

In a further embodiment, the one or more laser headlights and the camera are not employed only for the above described system for improvement of view at night, poor weather and fog, but rather at the same time they are employed for a system for communicating with other vehicles, for example for sending continuous status information, for warning the operators of preceding or oncoming vehicles of possible danger situations, or to initiate in oncoming vehicles with switched on high beams to automatically switch these to low beams.

For this purpose the laser light emitted essentially only for improving view is modulated with the information to be transmitted to another vehicle, which also has the above described camera and/or another IR-sensor and is in the transmission coverage of the laser light, these information can be extracted from the laser light and be evaluated or taken into consideration.

What is claimed is:

1. A process for improving the view in a vehicle, in particular at night, poor weather and fog, comprising:

emitting laser light in a wavelength outside the visible spectrum to a predetermined angle area, observing said angle area by means of a camera sensitive to said wavelength, supplying images from said camera to the vehicle operator, wherein said laser light is essentially continuously emitted only when one of (a) the headlights of the vehicle are in operation and (b) the vehicle is in motion.

2. A process according to claim 1, wherein when laser light is emitted in sequential intervals, the intervals between emission are substantially longer than the duration of emission.

3. A process according to claim 1, the laser light is emitted by at least two different types of laser headlights (2, 3), which respectively illuminate different parts of the angle area to be observed.

4. A process according to claim 1, wherein the laser light is produced at a location other than the front side of the vehicle, and is transmitted to the front side of the vehicle via one or more light guides.

5. A process according to claim 1, wherein information for communication with other vehicles is modulated onto the laser light.

6. A process for improving the view in a vehicle, in particular at night, poor weather and fog:

emitting laser light in a wavelength outside the visible spectrum to a predetermined angle area, observing said angle area by means of a camera sensitive to said wavelength, supplying images from said camera to the vehicle operator, wherein said laser light is essentially continuously emitted only when one of (a) the headlights of the vehicle are in operation and (b) the vehicle is in motion, wherein the field of view of the camera lies in an area of the windshield which is wiped over by windshield wipers, and wherein at least one of the camera and display device in the vehicle are operated synchronized with the windshield wipers.

* * * * *